INVENTOR.
Noel Meyer Rust and
George Earnshaw Partington
BY
ATTORNEY

Patented Sept. 30, 1952

2,612,636

UNITED STATES PATENT OFFICE 2,612,636

RADIO LOCATION AND DETECTION ARRANGEMENT

Noël Meyer Rust, Chelmsford, and George Earnshaw Partington, Langdale, England, assignors, by mesne assignments, to Radio Corporation of America, New York, N. Y., a corporation of Delaware Application July 10, 1947, Serial No. 760,097
In Great Britain January 28, 1946

Section 1, Public Law 690, August 8, 1946
Patent expires January 28, 1966

13 Claims. (Cl. 343—9)

This invention relates to radio location and detection arrangements, i. e. to so-called radar systems and more particularly to radar systems operating with continuous waves as distinct from wave pulses.

The main object of the invention is to provide improved continuous wave radar systems which will operate as moving target indicators—relatively moving targets may be quickly and easily distinguished from stationary targets, whereby targets of different relative velocities may be quickly and easily distinguished from one another, and whereby an individual target may be readily selected and followed and its relative velocity ascertained. The expressions "relatively moving," "relative velocities" and similar expressions employed in this specification refer to relative movement and relative velocity as between target and radar system either or both of which may move.

The radar systems which were widely used for military purposes during the World War of 1939–1945 and are now becoming generally known, were of the pulsed radar type. In a pulsed radar system a transmitter sends out, at a predetermined pulse repetition frequency, a sequence of substantially rectangular pulses of fixed, very high frequency energy. These pulses, after reflection from an aircraft or other radio reflecting object, are picked up by observing with the aid of a cathode ray tube and suitably associated circuits, the time taken by the radio energy to travel from the transmitting aerial to the object and thence back to the receiving aerial (commonly the same aerial as is employed for transmission). For a number of reasons which need not be discussed here the production of a radar system operating with continuous waves instead of wave pulses, and capable of giving a practical performance comparable with or better than that of the best pulsed radar systems is much to be desired. The copending application Serial No. 452,990, filed July 31, 1942, in the name of Irving Wolff, now Patent No. 2,422,157, issued June 10, 1947, describes an invention which provides such continuous wave radar systems and as there is much in common between the basic principles of the present invention and that of the invention in the Wolff application referred to, the last mentioned invention will first be briefly described.

The present invention, like those contained in the above mentioned Wolff application, employs what may be termed frequency modulated continuous wave transmission, that is to say, the transmitted energy is not interrupted (as in a pulsed radar system) but is varied in frequency in a predetermined manner over a predetermined range of frequencies. Consider what occurs in a radar system utilizing such a form of transmitted energy. Suppose that, during the interval taken by a radio wave to travel from the transmitter to a target and thence back to the receiver the transmitted frequency has changed from a given value to a second different value. Then, at the instant when a portion of the transmitted wave is received, the transmitter will be emitting a different frequency and the difference between these two frequenices will be a measure of the range of the target. Therefore, if the receiver is arranged to receive, in addition to the reflected energy, a component of energy direct from the transmitter, there will be produced a beat frequency whose value depends on the range of the target and by measuring the beat frequency the range may be computed. It will be evident, however, that there are serious practical difficulties in the way of producing a radar system operating in this way and of performance comparable to that of a pulsed radar system for the strength of a received signal will be an inverse function of its range and will depend also on the reflecting qualities of the target by which it is reflected. Any system depending on counting or discriminating the beat frequency signal produced will operate only if the said beat frequency signal is strong relative to any other signal which may be present at the same time at the counter or discriminator. If, therefore, there is a plurality of targets present at the same time, of which one gives rise to a strong echo signal (at the receiver) and the others to only weak received signals, such a system will allow of the detection and ranging of the said one target but not of the others.

According to the invention contained in the said Wolff application a radar system comprises means for transmitting continuous wave energy, means for varying the frequency of the transmitted energy, means for receiving reflected transmitted energy, means for combining reflected received energy with energy then being transmitted to produce beat frequency energy, frequency selective means for selecting among the beat frequencies produced between energy being transmitted and energy being received, and means for causing relative variation of the selected beat frequency and the rate of change of transmitted frequency to ascertain the range of a reflecting target. As will be seen such a radar system will operate if the rate of change of frequency of the transmitted wave is varied and the frequency to which the selective circuit is selective is kept constant or if the rate of change of frequency of the transmitted wave is kept constant and the frequency to which the selective circuit is selective is varied.

If a transmitted wave from a radar system strikes a target of zero relative velocity, i. e. a target which is neither approaching or receding from the said system, the reflected wave will be, of course, of the same frequency as the incident wave. If, however, there is relative velocity as between system and target then, by the well-known Doppler effect, the reflected wave will differ in frequency from the incident wave by an amount which is a function of the relative velocity, the reflected wave frequency being increased (relative to the incident wave frequency) if the system and target are approaching one another or decreased if they are receding from one another. The present invention consists in providing a radar system which is so arranged that this basic principle, in conjunction with the principles of the inventions above referred to, are utilized to provide relatively moving target indication or selection.

According to this invention a radar system comprises means for transmitting continuous wave energy, means for varying the frequency of the transmitted energy over a predetermined range of frequencies, increasing it during predetermined periods and decreasing it during other intermediate periods, means for receiving reflected transmitted energy, means for combining reflected received energy with energy then being transmitted to produce beat frequency energy, frequency selective means for selecting among the beat frequencies produced between energy being transmitted and energy being received, means for causing relative variation of the selected beat frequency and the rate of change of transmitted frequency, and means for utilizing, for indicating selecting or measuring the velocity of a target, the different beat frequencies produced by reflection from a relatively moving target at a given range during periods when the transmitted frequency is increasing as compared with periods during which said frequency is decreasing.

Preferably a system in accordance with this invention is also constructed in accordance with the design wherein the rate of change of frequency of the transmitted wave is kept constant over the periods during which said frequency is increased or decreased and the frequency to which the selective circuit is selective is correspondingly varied over said periods.

Preferably also the rate of change of frequency of the transmitted wave is the same but of opposite sign during periods of frequency increase and during periods of frequency decrease.

In carrying out the invention any of a wide variety of transmitted frequency-time curves may be adopted, e. g. a sinusoidal law of variation might be used. The preferred transmitted frequency-time curves are however (a) a symmetrical triangular curve in which a period of constant rate of frequency increase is followed by a like period of the same constant rate of frequency decrease and (b) a symmetrical truncated triangular curve in which successive like periods of constant and the same rates of frequency increase and decrease are separated by periods of constant transmitted frequency. In either case, if desired, controllable means may be provided for what may be termed "warping" the curves, i. e. controllably changing the rate of frequency increase and decrease. As an alternative to (b) above it is possible to alternate periods of symmetrical triangular frequency variation with periods of constant transmitted frequency.

The invention is illustrated in, and further explained in connection with the accompanying drawings.

Figure 1:
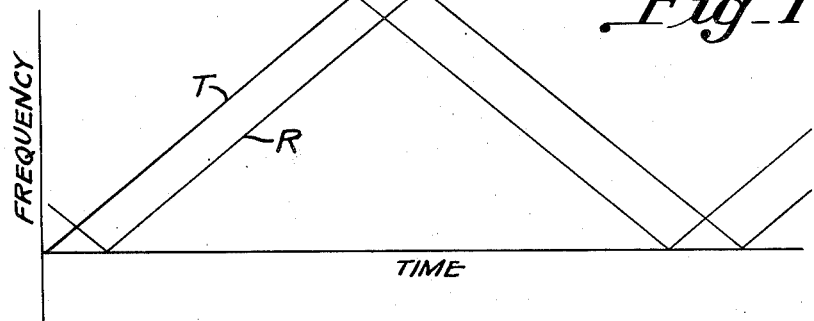
Figs. 1 to 3 are graphs that are referred to in explaining the invention.
Figure 2:
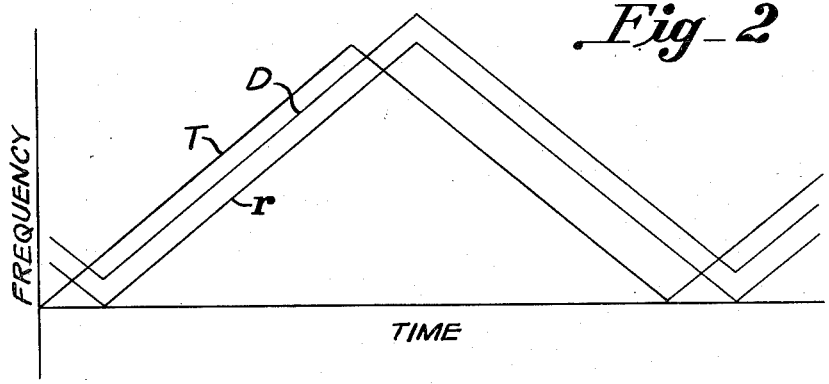
Figure 3:
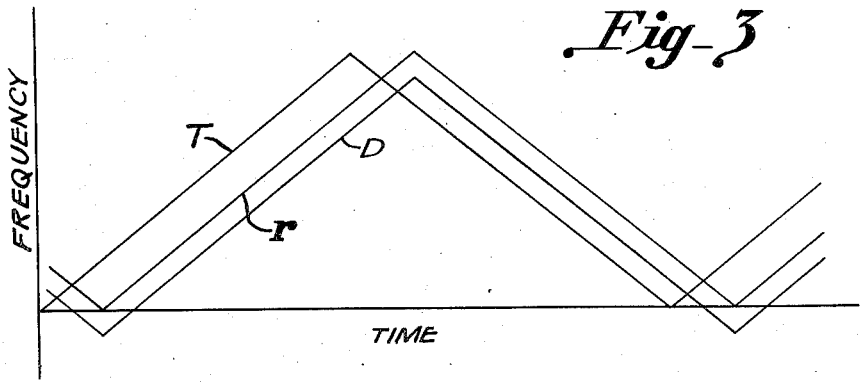

Referring first to Figs. 1 to 3 consider what occurs when a frequency modulated wave, whose frequency is modulated in accordance with a symmetrical rectilinear triangular shaped wave, is transmitted to and reflected from a target of zero relative velocity. The received wave will be a frequency modulated wave whose frequency is modulated in accordance with the same symmetrical triangular modulating wave. The two triangles will be similar but, because of the time taken by wave propagation to the target and back they will be displaced in time. This is illustrated in Fig. 1 in which T represents the frequency variation curve of the transmitted wave and R that of the received wave. If the transmitted and received energies are mixed, it will be seen that they will produce a constant difference or beat frequency of a value which is a function of the time displacement and therefore of the range of the target.

Now consider the case in which the target has relative velocity, e. g. the target and system are approaching one another at constant speed. This case is illustrated in Fig. 2 in which T again represents the transmitted frequency variation curve and $r$ is a repetition of R of Fig. 1, i. e. $r$ represents the received frequency variation curve which would occur if the target had zero relative velocity. Since, however, the target and system are approaching one another at constant speed the received frequency variation curve will be the summation of curve $r$ and a constant frequency due to this speed. The summation curve is shown at D. It will be apparent that now the difference or beat frequency will no longer be constant but will be alternately smaller than and larger than that which would be obtained if the target had zero velocity—smaller during the rising sides of the triangles (when the transmitted frequency is increasing) and larger during the falling sides (when the transmitted frequency is decreasing). An opposite effect is produced by a target receding from the system. This is illustrated in similar manner by Fig. 3 in which curves T and $r$ are as in Fig. 2 but curve D is the result of subtracting a constant frequency, due to the constant target speed away from the system, from curve $r$. In this case the beat or difference frequency will be increased when the transmitted frequency is increasing and decreased when said frequency is decreasing—in both cases as compared to the constant beat which would be obtained were the target of zero relative velocity. In each of Figs. 2 and 3 the means of the two beat frequencies will be that which would be obtained from a zero velocity. Accordingly, with a relatively moving target the mean between the beat frequencies during rising frequency and falling frequency of the transmitted wave is a measure of the instantaneous distance away of the object while the amount of displacement from the mean frequency, during the rising and falling frequency excursions is a measure of the instantaneous relative velocity, the sense of displacement during either rising excursions or falling excursions, depending upon whether the target is approaching or receding. Thus an approaching target will give a decrease in beat frequency during rising excursions and an increase during falling excursions while a receding target will give the opposite effect. The foregoing are the basic principles of the present invention.

Figure 4:
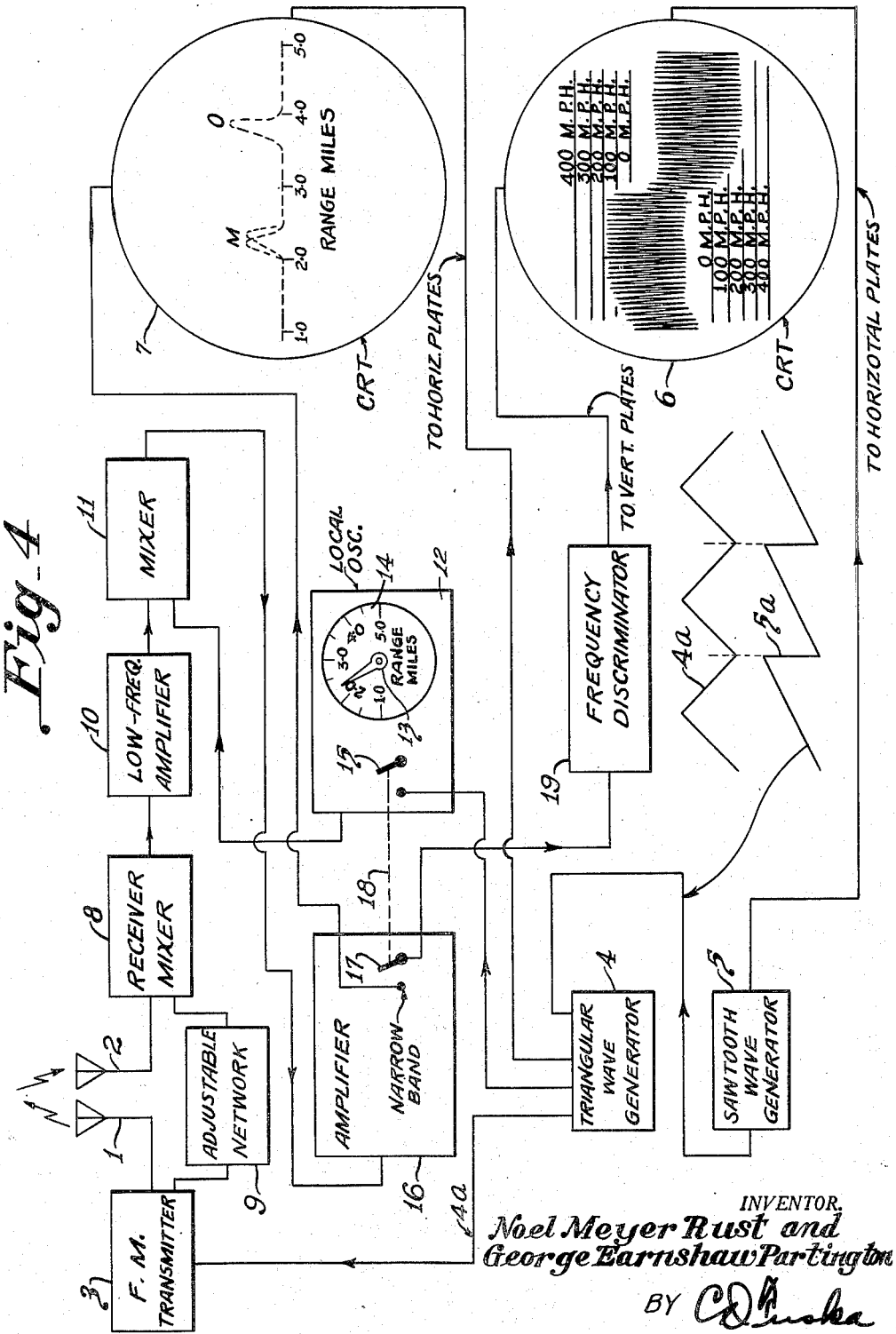
Fig. 4 is a block diagram showing one embodiment of the invention.

Referring now to Fig. 4 which shows in simplified block diagram form one embodiment of the invention, a radar system comprises a transmitting aerial 1 and a receiving aerial 2. For the sake of simplicity in drawing these are represented as though they were open aerials though in practice they might, of course, be of any of the types customary in radar working, e. g. highly directional radio reflector units with the usual electro-mechanical means for swinging them in elevation and azimuth. It is also possible to use a combined transmitter-receiver aerial system in manner well known per se.

The aerial 1 is energized by a frequency modulated transmitter 3 the frequency of which is modulated in accordance with a symmetrical triangular wave represented at 4a and produced by a triangular wave form generator 4 which controls the frequency of transmitter 3 in any convenient known manner. The generator 4 is controlled by or otherwise synchronized with a saw-tooth wave generator 5 producing a saw tooth control wave as shown at 5a so that the transmitted frequency from 1 makes two excursions, one up and one down, for each complete saw tooth, the "fly-back" or vertical face of which coincides in time with the change over from a downward frequency excursion to an upward frequency excursion. The saw-tooth generator 5 also supplies one coordinate of deflection (the horizontal coordinate) to a cathode ray tube, hereinafter termed the velocity indicator tube, the screen of which is represented at 6. The triangular generator 4 supplies one coordinate of deflection (the horizontal coordinate) to a cathode ray tube, hereinafter termed the range indicator tube, the screen of which is represented at 7.

Reflected waves incident upon aerial 2 are fed to a receiver-mixer 8 to which is also fed, directly, a controllable amount of energy from the transmitter 3. This controllable amplitude direct feed is represented by the arrow 9. Unit 8 feeds via a low frequency amplifier 10 into a mixer 11 which is connected to receive a second input from a local oscillator 12. This local oscillator 12 is a variable frequency calibrated oscillator the frequency from which can either be manually controlled by a handle 13, the pointer of which reads on a suitable marked range scale 14 or the said frequency can be automatically controlled by and in accordance with the triangular wave form from 4. Any suitable known circuit may be used for this control. When the switch 15 is in its left hand position in Fig. 4 the control of generator 12 is automatic by the generator 4; when the switch 15 is in its other position (that shown) the generator 12 is connected for manual control by handle 13. Beat frequency output from mixer 11 is fed to a variable band width amplifier 16 adjustable to pass either of two widths of band in dependence upon the position of a control switch 17 which is ganged as indicated at 18 with the switch 15. When the switch 17 is in its left hand position the band width is narrow and adapted to pass the single beat frequency which will appear at the input of amplifier 16 as the result of the reception of reflected waves from a zero relative velocity target. In this position of the switch 17 the output from 16 is fed to the vertical deflection system of the range indicating tube 7. When switch 17 is moved to its other position (that shown) the band width of amplifier 16 is increased to an extent sufficient to enable it to pass both the beat frequencies which will appear at its input as the result of the reception of reflected waves from a target whose relative velocity is as high as the system is intended to handle, for the higher the relative velocity the further apart the beat frequencies will be. In this position of switch 17 the output from amplifier 16 is fed to a quick acting frequency discriminator 19 which controls the vertical deflection in the velocity indicating tube 6. Discriminator 19 is arranged in any convenient manner known per se to produce vertical deflection in one direction in dependence upon the extent to which the input frequency departs from the predetermined mean frequency in one sense and to produce vertical deflection in the opposite direction in dependence upon the extent to which the input frequency departs from the mean frequency in the other sense. Tube 7 has a horizontal range scale as indicated and tube 6 has a series of horizontal relative velocity scale markings as indicated symmetrically on opposite sides of the horizontal diameter of the screen.

To use this radar system the switches 15, 17 are put in their left hand positions while searching for a target and the aerial system or systems is or are swung in elevation and azimuth as in the ordinary way. In this condition of working tube 6 is not used and it will be seen that the ray in tube 7 will make a horizontal sweep in one direction during increase of transmitted frequency and a return sweep at the same speed during decrease of transmitted frequency, the local oscillator frequency from 12 varying in accordance with the triangular wave form 4a. When a target is picked up an indication will appear on the tube 7. If the target has zero relative velocity it will give an ordinary single "blip" as indicated at O, for the "blip" during the ray deflection one way will superimpose on that during the deflection in the opposite direction. If, however, the target has relative velocity, a double "blip" will appear as at M, for now the outward and return deflection "blips" do not superimpose. The true range of the relatively moving target is mid-way between the two elements of the double "blip."

If it is desired to ascertain the relative velocity of the target the system is directed to and kept on the target (i. e. automatic searching in elevation and azimuth, if previously in progress, is stopped) the handle 13 is adjusted to the range as already indicated by tube 7 and the switches 15, 17 are thrown to the position shown. Discriminator 19 will now receive two frequencies alternately, one during periods of transmitted frequency increase and the other during periods of transmitted frequency decrease. Accordingly a trace as indicated will be obtained in tube 6, half of it being displaced above the horizontal axis and the other equally displaced below. The extent of displacement depends on the relative target speed which can be read off on the miles per hour (M. P. H.) marks. The sense of the relative velocity (away or towards the system) will also be instantly apparent because for one sense of velocity the trace will be displaced up on the left hand and down on the right (as shown) while for the other the trace will be displaced down on the left hand and up on the right. If desired the screen may be provided with quartering markings "Away" and "Towards" in convenient portions.

The system of Fig. 4 is capable of considerable modification. For example by providing suitable switching the same tube may be used at will for either range or velocity indication while forms of display other than the so-called "A type" displays described may be used; for example the range indicating tube could be arranged to give a so-called P. P. I. display. Again the saw-tooth and triangular waves 5a and 4a may be so synchronized that there is one saw tooth for each excursion up or down, i. e. the saw tooth frequency may be twice that shown at 5a. Such an arrangement is, however, not preferred, since additional means must then be provided to indicate sense of velocity.

Figure 5:
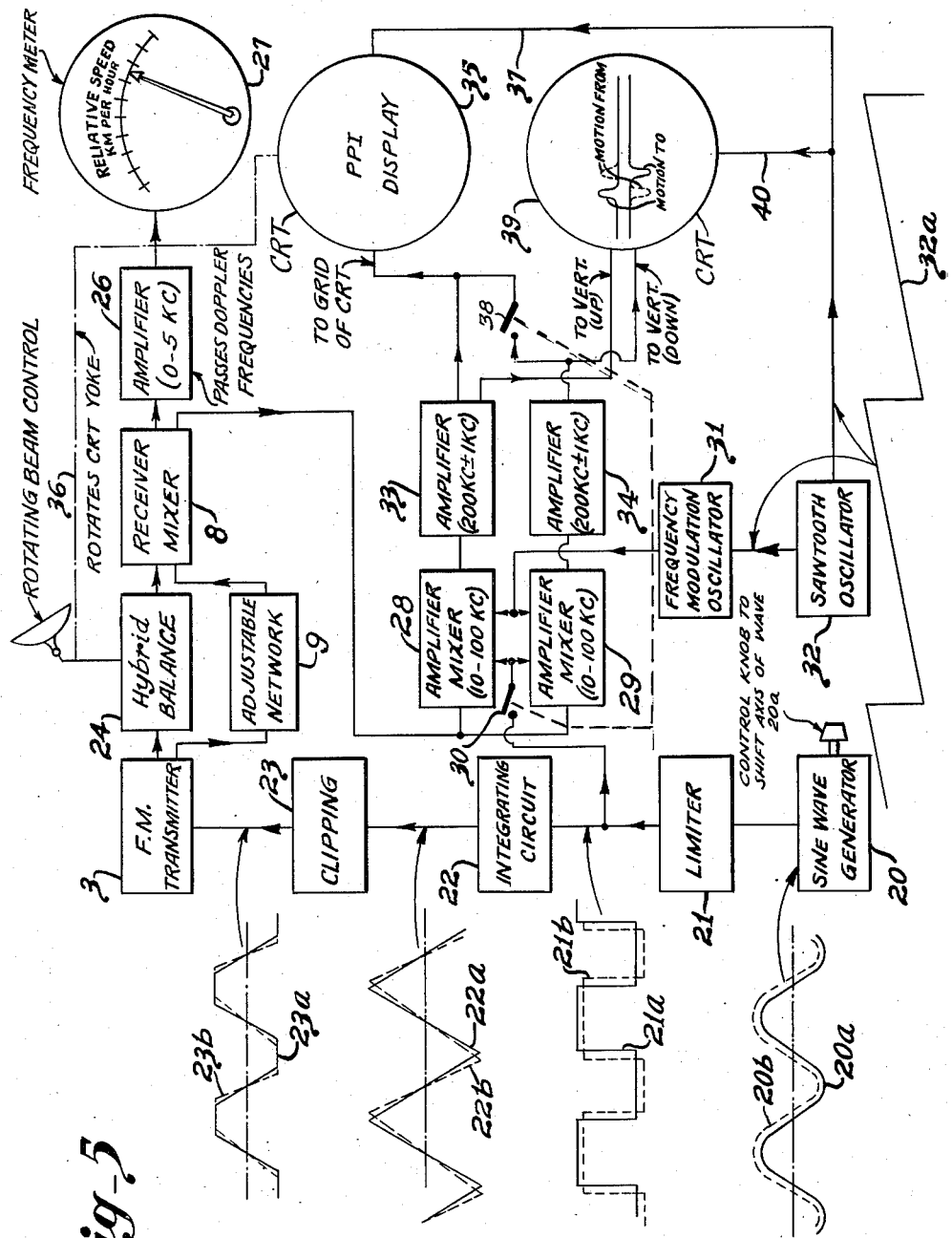
Fig. 5 is a block diagram showing another embodiment of the invention.

The system of Fig. 4 is quite suitable for very short wave working (waves of about 1 to 10 cms. or thereabouts) but involves technical difficulties for longer waves mainly because of the extent of rapidity of the frequency excursions required. Fig. 5 shows a preferred system in which the frequency excursions are reduced by using a truncated triangular instead of a simple triangular control. Moreover the system of Fig. 5 gives P. P. I. presentation, velocity measurement by a meter, simple indication of sense of velocity and also enables desired targets to be selectably picked out and undesired echoes, which might otherwise tend to obscure interpretation, to be eliminated or thrust into the back ground. In Fig. 5 similar references are used, where possible, for similar parts in Fig. 4.

Referring to Fig. 5, sinusoidal input as represented by the full line curve at 20a is supplied by a generator 20 as input to a limiter 21. The generator 20 is fitted with a bias or other control indicated by the control knob thereon and by the legend whereby the input wave may be made asymmetrical to a controllable extent, as indicated, for example by the dotted curve 20b. The limiter 21 transforms the wave 20a or 20b into a squared wave 21a or 21b respectively. This wave is applied to an integrating circuit 22 which transforms it again into a symmetrical triangular wave 22a (for wave 21a) or a "warped" triangle 22b (for wave 21b). The triangular wave is in turn passed to a clipping circuit 23 which truncates the triangle i. e. forms it into the wave 23a or 23b, the former when the original wave is as at 20a, the latter when the original wave is as at 20b. The output wave from the clipper 23 is the modulating control wave (corresponding to the wave 4a of Fig. 4) for the transmitter 3 which feeds, through a so-called hybrid balance unit 24 a combined transmitted and receiving highly directional aerial system 25. The aerial system 25 can be rotated and, if desired, swung in elevation also, for searching in the usual way by means not shown.

Reflected waves picked up by aerial 25 are fed through the hybrid balance unit 24 to a receiver mixer 8 which also receives controllable direct input from transmitter 3 via control unit 9. Output from mixer 8 is fed via a band pass amplifier 26 passing a band of, for example 0 to 5 kc. to any convenient electronic frequency meter represented by its indicating instrument 27 which is calibrated in units of relative velocity. The amplifier 26 is in effect designed to pass what may be termed the Doppler range of frequencies, i. e. the range of differences between transmitted and reflected frequencies due to Doppler effect at a relatively moving target.

Output from mixer 8 is also fed to the parallel input circuits of two band pass amplifier-mixers 28, 29 adapted to pass bands, of for example 10–100 kc. These amplifiers thus reject the Doppler range but accept the echo beat frequency ranges and it is to be understood that the rate of change of the transmitted frequency should be so chosen (in relation to the limits of ranges which the system is to handle) that the Doppler frequencies are always well below the echo beat frequencies. Unit 28 is for use when the transmitted frequency is rising and unit 29 for use when it is falling and they are rendered alternately operative, in the required fashion, when switch 30 is closed, by the controlling action of the output wave from 21 fed through switch 30. Units 28, 29 also receive local oscillation input from a frequency modulated oscillator 31 whose frequency is varied between the limits of, say 210 and 300 kc. under the control of a modulating saw tooth oscillator 32 producing a saw tooth wave as shown at 32a. Each unit 28, 29 is followed by a band pass amplifier 33 or 34, for example for the band 200 kc.±1 kc. Amplifier 33 feeds its output to control the brightness of the ray in a P. P. I. display oscillograph 35 whose azimuth deflection (circular sweep) control is provided in known manner from the means driving the rotating aerial 25 (this control is indicated by the chain line 36) and whose radial deflection control is provided by the saw tooth oscillator 32, the sawtooth wave being supplied over the conductor 37. When switch 38 is closed, brightness control input is also fed to tube 35 from amplifier 34. Outputs from amplifiers 33 and 34 are also fed independently vertically to deflect the two beams in a double beam "A type" scan oscillograph 39, amplifier 33 deflecting the upper beam upwards and amplifier 34 deflecting the lower beam downwards. Horizontal deflection of both beams is simultaneously controlled by the saw tooth generator 32 as indicated by the line 40.

With this system, for a normal P. P. I. presentation switches 30 and 38 are opened, wave 20a is applied to 21 and an ordinary P. P. I display will occur on tube 35. Range will also be indicated by an ordinary A type display on the upper half of tube 39. When it is desired to investigate targets with relative velocity switches 30 and 38 are closed. The "up-stroke" unit 28 is now insensitive on the "down-stroke" (when the transmitted frequency is decreasing) and the "down-stroke" unit 29 is insensitive on the "up-stroke" (when the transmitted frequency is increasing). The switches 30, 38 are ganged and the gang control handle therefore also operates a manual brightness control (not shown) whereby the P. P. I. tube is adjusted, in the absence of signals, to the half-bright condition. Now, since "target spots" on the P. P. I. tube corresponding to zero relative velocity targets will be alternately brightened and darkened by equal amounts on successive up and down strokes, they will disappear from the screen, or at any rate be relegated to the background, whereas relatively moving targets will appear as brighter or darker spots on the screen (in dependence upon their sense of relative motion "away" or "towards") because each of such targets will give rise to different beat frequencies, due to Doppler effect, on the up and down strokes. By "warping" the control at 20, i. e. by transforming the wave 20a into a wave such as 20b the rate of change of transmitted frequency in up and down strokes may be varied and one or more undesired targets at a particular relative velocity (e. g. a ground return target in the case in which the equipment is air-borne) may be similarly relegated to the back ground and the P. P. I. presentation thus controllably clarified. By directing the aerial 25 on a particular target with the switches 30 and 38 closed its relative velocity may be directly read on the meter 27 and the sense of velocity ("away" or "towards") on the tube 39, for whereas the two "blips" on the two halves of this tube will be opposite one another for a target of zero velocity, they will be laterally displaced in relation to one another for a moving target by an amount dependent on the relative velocity and in a direction dependent on the sense of the velocity. This is indicated in Fig. 5 on the representation of the tube.

Figure 6A:
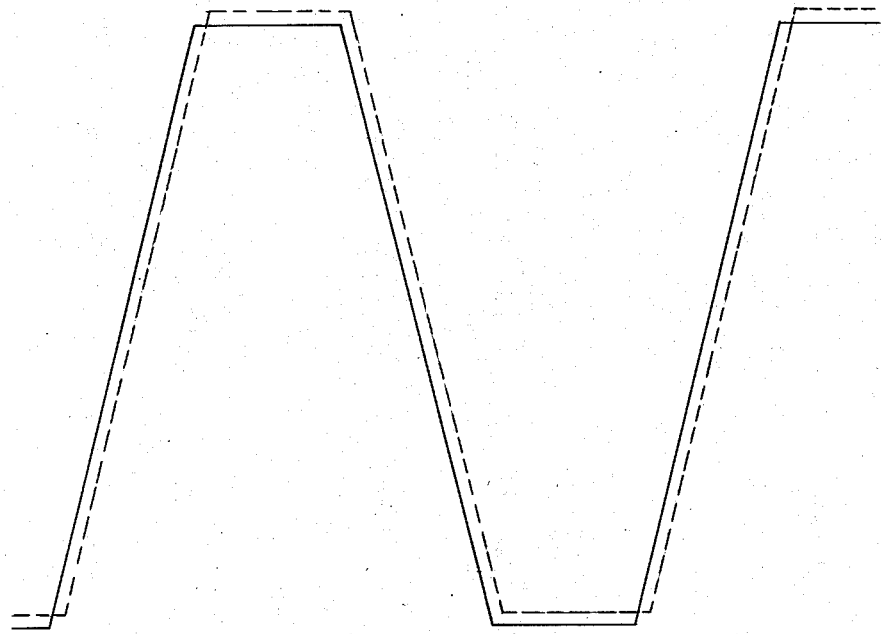
Figs. 6a and 6b are additional graphs that are referred to in explaining the invention.
Figure 6B:
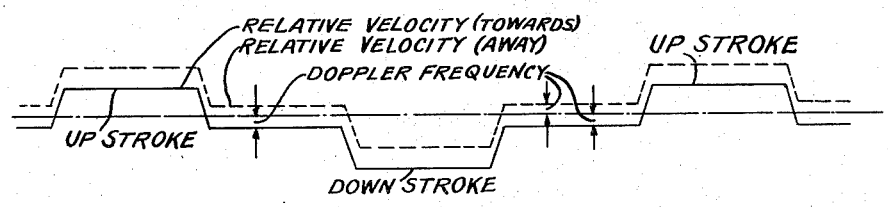

The graphical Figs. 6a and 6b will assist in an understanding of the operation. In Fig. 6a the full line at (a) represents the variation of transmitted frequency and the dotted line the variation of reflected frequency from a target moving towards the system. At (b) in Fig. 6b is shown the variation of the difference between transmitted and received frequencies. The full line at (b) corresponds to that shown by Fig. 6a while the dotted line is for the case of a target of the same relative velocity but moving away from the system. In both cases there are three sets of beat frequencies (1) the upstroke beat corresponding to the range beat ± the Doppler frequency (2) the "flat top" beat, corresponding to the Doppler frequency and (3) the down stroke beat corresponding to the range beat ± the Doppler frequency.

We claim as our invention:

1. A radar system comprising means for transmitting continuous wave energy, means for varying the frequency of the transmitted energy over a predetermined range of frequencies, increasing it during predetermined periods and decreasing it during other intermediate periods, means for receiving reflected transmitted energy from reflecting objects, means for combining reflected received energy with energy then being transmitted to produce beat frequency energy, frequency selective means for selecting among the beat frequencies produced between energy being transmitted and energy being received, means for indicating the distances to said objects, said last means including means for causing relative variation of the selected beat frequency and the rate of change of transmitted frequency, said means for varying the frequency of the transmitted energy comprising means for producing a repetitive signal having the wave form of a truncated triangle and for varying the frequency of the transmitted energy thereby so that said energy is transmitted at periodically recurring intervals with unchanging frequency, means for selecting any beat frequencies produced in said combining means during said intervals due to relative motion of said reflecting objects with respect to said radar system, and means for utilizing said selected beat frequencies due to relative motion to indicate the amount of said relative motion, and wherein frequency selective means is provided to pass only said beat frequencies due to relative motion and wherein a frequency meter is provided to which the output of said frequency selective means is applied, and wherein the system further comprises, in the receiver portion of the system, a mixer for reflected energy and energy then being transmitted, a pair of frequency selective circuit arrangements of periodically varied frequency selectivity and each adapted for the range of echo beat frequencies the system is designed to handle, means for rendering one only of said arrangements operative during periods of transmitted frequency increase and the other operative only during periods of transmitted frequency decrease, and means for separately indicating, against a common time scale in synchronized accordance with the periodic variations of frequency selectivity, target indicating signals supplied by said arrangements.

2. A system as claimed in claim 1 wherein the indicating means is constituted by a double beam cathode ray tube having means for deflecting its two beams back and forth together to provide the time scale, and means for subjecting each beam to coordinate control by one of the indicating signal outputs provided by the two frequency selective arrangements.

3. A radar system comprising means for transmitting continuous wave energy, means for varying the frequency of the transmitted energy over a predetermined range of frequencies, increasing it during predetermined periods and decreasing it during other intermediate periods, means for receiving reflected transmitted energy from reflecting objects, means for combining reflected received energy with energy then being transmitted to produce beat frequency energy, frequency selective means for selecting among the beat frequencies produced between energy being transmitted and energy being received, means for indicating the distances to said objects, said last means including means for causing relative variation of the selected beat frequency and the rate of change of transmitted frequency, and means for changing the rate of increase of the frequency of the transmitted energy with respect to the rate of decrease of the frequency of the transmitted energy and thereby adjusting the ratio of said rates whereby the Doppler effect in the distance indications may be avoided for reflecting objects having a certain relative speed with respect to said radar system.

4. The invention according to claim 3 wherein said means for varying the frequency of the transmitted energy comprises means for producing a substantially triangular wave and for varying the frequency of the transmitted energy thereby, and wherein means is provided to adjustably change the steepness of the up slope of said triangle with respect to the steepness of the down slope of said triangle and thereby change the ratio of the steepness of the up slope to the steepness of the down slope.

5. A system for measuring distance which comprises means for radiating a radio wave toward reflecting objects, means for cyclically frequency modulating said wave to cause its frequency to increase and then decrease cyclically in a predetermined way with respect to time, means for receiving the wave after reflection from said objects and for heterodyning it with a portion of said modulated wave which has not been reflected whereby signals each having a beat or difference frequency are produced, frequency selective means for selecting among the beat frequencies produced between energy being transmitted and energy being received, means for causing relative variation of the selected beat frequency and the rate of change of transmitted frequency, an indicator having a distance scale and an index marking means, means for synchronously varying the position of said index marking means with respect to said scale in synchronism with said relative variation of the selected beat frequency and the rate of change of transmitted frequency whereby the distances to said reflecting objects are indicated, and means for adjusting the rate of increase of the frequency of the radiated wave with respect to the rate of decrease of the frequency of the transmitted energy and thereby adjusting the ratio of said rates whereby the Doppler effect in the distance indications may be avoided for reflecting objects having a certain relative speed with respect to said system.

6. The invention according to claim 5 wherein means is provided to make both said cyclic frequency increase and said cyclic frequency decrease substantially linear with respect to time.

7. A radar system comprising means for transmitting continuous wave energy, means for varying the frequency of the transmitted energy over a predetermined range of frequencies, increasing it during predetermined periods and decreasing it during other intermediate periods, means for receiving reflected transmitted energy, said receiver portion of the system comprising a mixer for combining reflected energy and energy then being transmitted and for thereby producing beat frequency energy, a pair of frequency selective circuit arrangements of periodically varied frequency selectivity and each adapted for the range of echo beat frequencies the system is designed to handle, means for rendering one only of said arrangements operative during periods of transmitted frequency increase and the other operative only during periods of transmitted frequency decrease, a plan-position-indicator display cathode ray tube, means for supplying for brightness control in said tube, the indicating signal outputs provided by the two frequency selective arrangements, a scanning aerial system, means for providing azimuth deflection control in the plan-position-indicator tube in correspondence with the azimuth movements of said aerial system, and means for providing radial deflection control in the plan-position-indicator tube in synchronized accordance with the periodic variation of frequency selectivity.

8. A radar system comprising a transmitter for transmitting continuous wave energy, means comprising a triangular wave form generator for cyclically varying the frequency of said transmitter, a receiver wherein energy directly obtained from said transmitter and energy reflected from a target are mixed, a local oscillator, a mixer fed from said receiver and from said local oscillator, means for at will manually controlling the frequency of said oscillator or automatically controlling the frequency of said oscillator by the triangular wave, an amplifier having two selectable pass band widths fed from said mixer, a frequency discriminator, means for feeding the output from said amplifier when in the wide band condition and when the oscillator is automatically controlled to said discriminator, a saw tooth wave generator whose frequency is interlocked with the triangular wave generator, and cathode ray tube indicator means supplied with signal from said amplifier for indicating range by coordinate deflection produced by the amplifier signal output when the amplifier is in the narrow band condition and when the oscillator is manually controlled against time deflection controlled by the triangular wave and cathode ray tube indicator means supplied with signal from said discriminator for indicating relative velocity by coordinate deflection produced by the discriminator against time deflection controlled by the saw tooth wave.

9. The invention according to claim 8 wherein each saw tooth wave is synchronized with and occupies the time duration of a complete triangular wave.

10. A radar system comprising means for transmitting continuous wave energy, means for varying the frequency of the transmitted energy over a predetermined range of frequencies, increasing it during predetermined periods and decreasing it during other intermediate periods, means for receiving reflected transmitted energy, said receiver portion of the system comprising a mixer for combining reflected energy and energy then being transmitted and for thereby producing beat frequency energy, a pair of frequency selective circuit arrangements of periodically varied frequency selectivity and each adapted for the range of echo beat frequencies the system is designed to handle, means for rendering one only of said arrangements operative during periods of transmitted frequency increase and the other operative only during periods of transmitted frequency decrease, and means for separately indicating, against a common time scale in synchronized accordance with the periodic variations of frequency selectivity, target indicating signals supplied by said arrangements.

11. A radar system comprising means for transmitting continuous wave energy, means for varying the frequency of the transmitted energy over a predetermined range of frequencies, increasing it during predetermined periods and decreasing it during other intermediate periods, means for receiving reflected transmitted energy from reflecting objects, means for combining reflected received energy with energy then being transmitted to produce beat frequency signals, means for indicating the distances to said objects as a function of said beat frequency signals, and means for changing the rate of increase of the frequency of the transmitted energy with respect to the rate of decrease of the frequency of the transmitted energy and thereby adjusting the ratio of said rates whereby the Doppler effect in the distance indications may be avoided for reflecting objects having a certain relative speed with respect to said radar system.

12. The invention according to claim 11 wherein said means for varying the frequency of the transmitted energy comprises means for producing a substantially triangular wave and for varying the frequency of the transmitted energy thereby, and wherein means is provided to adjustably change the steepness of the up slope of said triangle with respect to the steepness of the down slope of said triangle and thereby change the ratio of the steepness of the up slope to the steepness of the down slope.

13. The method of operating a radar system of the type comprising; means for transmitting continuous wave energy, means for varying the frequency of the transmitted energy over a predetermined range of frequencies, increasing it during predetermined periods and decreasing it during other intermediate periods, means for receiving reflected transmitted energy from reflecting objects, means for combining reflected received energy with energy then being transmitted to produce beat frequency signals, and means for indicating the distances to said objects as a function of said beat frequency signals, said method comprising the step of changing the rate of increase of the frequency of the transmitted energy with respect to the rate of decrease of the frequency of the transmitted energy and thereby adjusting the ratio of said rates to a value where the Doppler effect in the distance indication of a reflecting object having a certain relative speed with respect to said radar system is avoided.

NOËL MEYER RUST.
GEORGE EARNSHAW PARTINGTON.

REFERENCES CITED

The following references are of record in the file of this patent:

UNITED STATES PATENTS

| Number | Name | Date |
|---|---|---|
| 2,236,893 | Chaffee | Apr. 1, 1941 |
| 2,409,448 | Rost | Oct. 15, 1946 |
| 2,416,351 | Schelleng | Feb. 24, 1947 |
| 2,451,822 | Guanella | Oct. 19, 1948 |
| 2,453,169 | Varian | Nov. 9, 1948 |
| 2,505,692 | Staal | Apr. 25, 1950 |

FOREIGN PATENTS

| Number | Country | Date |
|---|---|---|
| 897,437 | France | May 22, 1944 |